United States Patent
Moran

(10) Patent No.: US 7,680,568 B2
(45) Date of Patent: Mar. 16, 2010

(54) METHOD OF CONTROLLING ENGINE STOP-START OPERATION FOR HEAVY-DUTY HYBRID-ELECTRIC AND HYBRID-HYDRAULIC VEHICLES

(75) Inventor: Brian D. Moran, La Mesa, CA (US)

(73) Assignee: ISE Corporation, Poway, CA (US)

( * ) Notice: Subject to any disclaimer, the term of this patent is extended or adjusted under 35 U.S.C. 154(b) by 160 days.

(21) Appl. No.: 12/057,281

(22) Filed: Mar. 27, 2008

(65) Prior Publication Data
US 2008/0177434 A1 Jul. 24, 2008

Related U.S. Application Data

(60) Division of application No. 11/390,605, filed on Mar. 28, 2006, and a continuation-in-part of application No. 11/289,069, filed on Nov. 29, 2005.

(60) Provisional application No. 60/632,046, filed on Dec. 1, 2004.

(51) Int. Cl.
 B60K 6/40 (2007.10)
 B60W 10/06 (2006.01)
 B60L 11/02 (2006.01)
 B60K 6/46 (2007.10)
(52) U.S. Cl. .................... 701/22; 701/112; 903/914; 180/65.275; 180/65.245
(58) Field of Classification Search ............ 701/22, 701/112; 180/65.275, 65.22–65.26; 903/914
See application file for complete search history.

(56) References Cited

U.S. PATENT DOCUMENTS

| | | |
|---|---|---|
| 3,791,473 A | 2/1974 | Rosen |
| 4,196,587 A | 4/1980 | Shiber |
| 4,282,947 A | 8/1981 | Kemper |
| 4,533,011 A | 8/1985 | Heidemeyer et al. |
| 5,081,365 A | 1/1992 | Field et al. |
| 5,343,970 A | 9/1994 | Severinsky |
| 5,402,046 A | 3/1995 | Jeanneret |
| 5,568,023 A | 10/1996 | Grayer et al. |
| 5,650,713 A | 7/1997 | Takeuchi et al. |
| 5,698,905 A | 12/1997 | Ruthlein et al. |
| 5,788,597 A | 8/1998 | Boll et al. |

(Continued)

OTHER PUBLICATIONS

Simon, "Update on ThunderVolt Series-Hybrid Propulsion Alternatives for Transit Buses", EVAA/EPRI Workshop, Hollywood Beach, FL (Dec. 10, 2002).

Primary Examiner—Eric Bolda
Assistant Examiner—Ari M Diacou
(74) Attorney, Agent, or Firm—Stephen C. Beuerle; Procopio Cory Hargreaves & Savitch LLP

(57) ABSTRACT

A start-stop or idle-stop method for a heavy-duty hybrid vehicle that turns off the fuel supply while maintaining the crankshaft rotation of the internal combustion engine when the vehicle stops or, optionally, when the vehicle travels downhill, travels in a noise sensitive location, travels in an exhaust emissions sensitive location, or operates in an emergency situation. The stop-start or idle-stop method automatically turns on the engine fuel supply to restart combustion when the vehicle starts accelerating, is no longer traveling downhill, is no longer traveling in a noise sensitive or exhaust sensitive location, is no longer in an emergency situation, or has dropped below the minimum energy storage restart level.

22 Claims, 8 Drawing Sheets

U.S. PATENT DOCUMENTS

| | | | |
|---|---|---|---|
| 5,823,280 | A | 10/1998 | Lateur et al. |
| 5,841,201 | A | 11/1998 | Tabata et al. |
| 5,954,779 | A | 9/1999 | Dietzel |
| 5,996,722 | A | 12/1999 | Price |
| 6,018,694 | A | 1/2000 | Egami et al. |
| 6,098,733 | A | 8/2000 | Ibaraki et al. |
| 6,098,734 | A | 8/2000 | Kawamura et al. |
| 6,114,775 | A | 9/2000 | Chung et al. |
| 6,131,538 | A | 10/2000 | Kanai |
| 6,166,449 | A | 12/2000 | Takaoka et al. |
| 6,170,587 | B1 | 1/2001 | Bullock |
| 6,209,672 | B1 | 4/2001 | Severinsky |
| 6,213,233 | B1 | 4/2001 | Sonntag et al. |
| 6,323,608 | B1 | 11/2001 | Ozawa |
| 6,385,529 | B1 | 5/2002 | Minowa et al. |
| 6,406,102 | B1 | 6/2002 | Arnold |
| 6,459,980 | B1 | 10/2002 | Tabata et al. |
| 6,461,266 | B1 | 10/2002 | Weisz |
| 6,476,571 | B1 | 11/2002 | Sasaki |
| 6,481,516 | B1 | 11/2002 | Field et al. |
| 6,483,198 | B2 | 11/2002 | Schmitz et al. |
| 6,484,833 | B1 | 11/2002 | Chhaya et al. |
| 6,487,477 | B1 | 11/2002 | Woestman et al. |
| 6,622,804 | B2 | 9/2003 | Schmitz et al. |
| 6,624,527 | B1 | 9/2003 | Crombez et al. |
| 6,644,427 | B2 | 11/2003 | Schulte |
| 6,672,415 | B1 | 1/2004 | Tabata |
| 6,700,213 | B1 | 3/2004 | Wakashiro et al. |
| 6,817,329 | B2 | 11/2004 | Buglione et al. |
| 6,961,654 | B2 | 11/2005 | Boggs |
| 2001/0039230 | A1 | 11/2001 | Severinsky et al. |
| 2002/0069000 | A1 | 6/2002 | Nakao |
| 2002/0096137 | A1 | 7/2002 | Kobayashi et al. |
| 2002/0142884 | A1 | 10/2002 | Kitajima et al. |
| 2002/0143441 | A1 | 10/2002 | Yamaguchi et al. |
| 2002/0188387 | A1 | 12/2002 | Woestman et al. |
| 2003/0073540 | A1 | 4/2003 | Eguchi et al. |
| 2003/0168263 | A1 | 9/2003 | Botti et al. |
| 2004/0030469 | A1 | 2/2004 | MacBain |
| 2005/0228553 | A1 | 10/2005 | Tryon |

METHOD OF CONTROLLING ENGINE STOP-START OPERATION FOR HEAVY-DUTY HYBRID-ELECTRIC AND HYBRID-HYDRAULIC VEHICLES

CROSS-REFERENCE TO RELATED APPLICATIONS

This application is a divisional of U.S. patent application Ser. No. 11/390,605 filed Mar. 28, 2006, which is a continuation in part of U.S. patent application Ser. No. 11/289,069 filed Nov. 29, 2005, and claims the benefit of U.S. Provisional Application No. 60/632,046 filed Dec. 1, 2004 under 35 U.S.C. 119(e). All of the above applications are incorporated by reference as though set forth in full.

FIELD OF THE INVENTION

The field of the invention relates to the stop-start operation of a hybrid-electric or hybrid-hydraulic heavy-duty vehicle with a gross vehicle weight rating of 10,000 lbs or higher.

BACKGROUND OF THE INVENTION

In typical heavy-duty vehicle applications, including those with hybrid drive systems, a rotating internal combustion engine includes multiple gear and/or pulley and belt power take-offs (PTOs) that operate the vehicle subsystems and accessories. As a result, turning off the engine causes the vehicle subsystems and accessories to be turned off.

It is desirable to eliminate engine idling at vehicle stops to, among other things, increase fuel economy, minimize noise, and minimize engine exhaust emissions pollution to improve the quality of the operating environment. This is especially true for transportation and delivery vehicles such as, but not limited to, urban transit buses and local package freight pick up and delivery vans that may experience hundreds of stops during daily operation.

A driver could manually turn off and turn on an engine when stopped; however, in addition to the problem of the vehicle subsystems and accessories not operating, a typical electric starter motor for the internal combustion engine would wear out rather quickly because it is typically not designed for the hundreds of stop-starts per day of transportation and delivery vehicles. Furthermore, stopping and restarting the engine rotation and associated PTO engine coolant and lubrication pumps could have an effect on engine wear and durability.

SUMMARY OF THE INVENTION

An aspect of the present invention involves a method for controlling the automatic shut down or engine turn-off during vehicle stops or downhill coasting and the automatic engine restart during vehicle acceleration. Engine shut down or turn-off and automatic restart may involve only turning the fuel supply off and on while maintaining the engine rotation by using the generator/motor and energy storage of a hybrid drive vehicle, or an integrated starter-alternator with the energy storage of a standard drive vehicle. Turning off the fuel supply while maintaining engine rotation during vehicle stops or extended downhill travel stops the combustion and exhaust emissions, minimizes engine noise, while maintaining the operation of PTO accessories.

During downhill travel the generator/motor can continue to spin the engine with the fuel supply cut off by using the energy available from the braking regeneration operating mode of the electric traction propulsion motors of a hybrid-electric vehicle.

In another aspect of the invention, a hybrid-electric vehicle has all or part of the vehicle propulsion power supplied by an electric motor and has an on board electric energy storage to assist the primary power unit during vehicle acceleration power requirements. The energy storage unit can be charged from available excess primary power and/or braking regeneration energy supplied from the electric motor/generator during electromagnetic braking deceleration. In this invention the energy storage unit also supplies power to operate vehicle accessory subsystems such as the heating, ventilation, and air conditioning (HVAC) system, hydraulic system for steering and equipment actuators, compressed air system for brakes and air bag suspensions, and various 12 volt and 24 volt standard accessories. The energy storage unit may also supply power to spin an internal combustion engine by means of the electric power generator operating as a motor that is mechanically coupled to an engine. Such spinning can be used to start the engine or maintain engine rotation during fuel cut off.

The major hybrid-electric drive components are an internal combustion engine mechanically coupled to an electric power generator, an energy storage device such as a battery or an ultracapacitor pack, and an electrically powered traction motor mechanically coupled to the vehicle propulsion system. The vehicle has accessories that can be powered from the energy storage and vehicle operation does not require that the engine be running for stopping, standing, coasting, or startup acceleration. Alternatively, vehicle accessories may be mounted as engine PTO's that can be powered by spinning the engine by means of the mechanically coupled electric power generator/motor with electrical power supplied by the energy storage. This aspect of the present invention applies to a heavy-duty vehicle with an engine mechanically connected to a generator, an energy storage subsystem, and an electric traction motor for vehicle propulsion. The electric generator/motor, energy storage, and traction motor/generator are all electrically connected to a high voltage power distribution network.

For a series hybrid-electric configuration the engine is only connected to the generator and not mechanically connected to the vehicle wheel propulsion.

For a parallel hybrid-electric configuration the engine and the electric traction motor are both mechanically connected to the vehicle wheel propulsion. Furthermore, the parallel configuration has an electric traction motor than can also act as a generator and includes the capability to mechanically decouple the engine-generator combination from the vehicle wheel propulsion; or the parallel configuration has the capability to mechanically decouple the engine from the electric motor traction propulsion and include a separate generator-starter that is mechanically coupled to the engine and can be used to charge the energy storage system and start the engine hundreds of times per day. Alternatively, with power supplied from the energy storage or braking regeneration of the traction motor/generator the generator-starter can be used to spin the engine with the fuel supply turned off, thereby, powering the PTO accessories mechanically attached to the engine crankshaft rotation.

In a further aspect of the invention, a hybrid-hydraulic vehicle has all or part of the vehicle propulsion power supplied by a hydraulic motor and has an on board hydraulic accumulator energy storage to assist the primary power unit during vehicle acceleration power requirements. The energy storage unit can be charged from available excess primary power and/or braking regeneration energy supplied from the hydraulic motor/pump during hydraulic braking deceleration. In this aspect the energy storage unit also supplies power to operate hydraulically powered or hydraulic-electrically powered vehicle accessory subsystems such as, but not limited to, the heating, ventilation, and air conditioning (HVAC) system, hydraulic system for steering and equipment actuators, compressed air system for brakes and air bag suspensions, and various 12 volt and 24 volt standard accessories. The energy storage unit may also supply power to spin an internal combustion engine by means of hydraulic pump operating as a hydraulic motor that is mechanically coupled to an engine. Such spinning can be used to start the engine or maintain engine rotation during fuel cut off. This spinning can occur during a vehicle stop or during downhill travel similarly as described above for the hybrid-electric vehicle.

The major hybrid-hydraulic drive components are an internal combustion engine mechanically coupled to hydraulic pump, a hydraulic accumulator energy storage device, and a hydraulically powered traction motor mechanically coupled to the vehicle propulsion system. The vehicle has accessories that can be powered from the energy storage and vehicle operation does not require that the engine be running for stopping, standing, or startup acceleration. Alternatively, the hydraulic pump/motor can spin the engine with the fuel cut off to operate the PTO accessories. This aspect of the present invention applies to a heavy-duty vehicle with an engine mechanically connected to a hydraulic pump, an energy storage subsystem such as a hydraulic accumulator, and a hydraulic traction motor for vehicle propulsion. The pump, energy storage, and traction motor are all hydraulically connected to a high pressure power distribution network.

For a series hybrid-hydraulic configuration the engine is only connected to the hydraulic pump and not mechanically connected to the vehicle wheel propulsion.

For a parallel hybrid-hydraulic configuration the engine and the hydraulic traction motor are both mechanically connected to the vehicle wheel propulsion. Furthermore, the parallel configuration has a hydraulic traction motor than can also act as a hydraulic pump and includes the capability to mechanically decouple the engine-pump combination from the vehicle wheel propulsion; or the parallel configuration has the capability to mechanically decouple the engine from the hydraulic motor traction propulsion and includes a separate electric or hydraulic generator-starter that is mechanically coupled to the engine and can be used to charge the low voltage energy storage system and start the engine hundreds of times per day.

BRIEF DESCRIPTION OF THE DRAWINGS

The accompanying drawings, which are incorporated in and form a part of this specification, illustrate the logic flow of the invention and its embodiments, and together with the description, serve to explain the principles of this invention.

DETAILED DESCRIPTION OF THE INVENTION

Figure 1A:
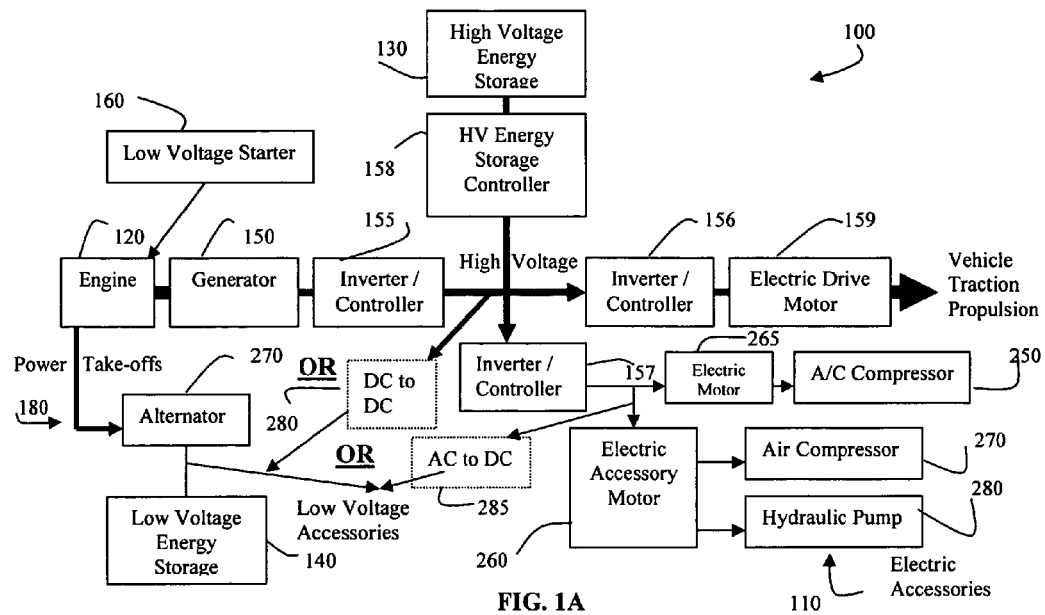
FIG. 1A is an block diagram of an embodiment of a series hybrid-electric drive system with electrically powered accessories.

With reference to FIG. 1A, an embodiment of a series hybrid-electric drive system 100 with electrically powered accessories 110 will be described. An engine 120 can be turned off because both the high voltage requirements and the low voltage requirements are met by respective energy storages 130, 140. A generator 150 is operated as a motor to spin the engine 120 during frequent restarts. A low-voltage engine starter 160 may be used infrequently with the generator 160 whenever the high-voltage energy storage 130 can not deliver enough power to the generator 150 for spinning the engine 120 during engine start. For example, in an implementation of this embodiment where ultracapacitors are used for energy storage, the low voltage starter 160 is used at the beginning of the day when the ultracapacitors are empty. The engine 120 may be any internal combustion engine that would be used to produce enough power to provide traction for propelling the vehicle.

Figure 1B:
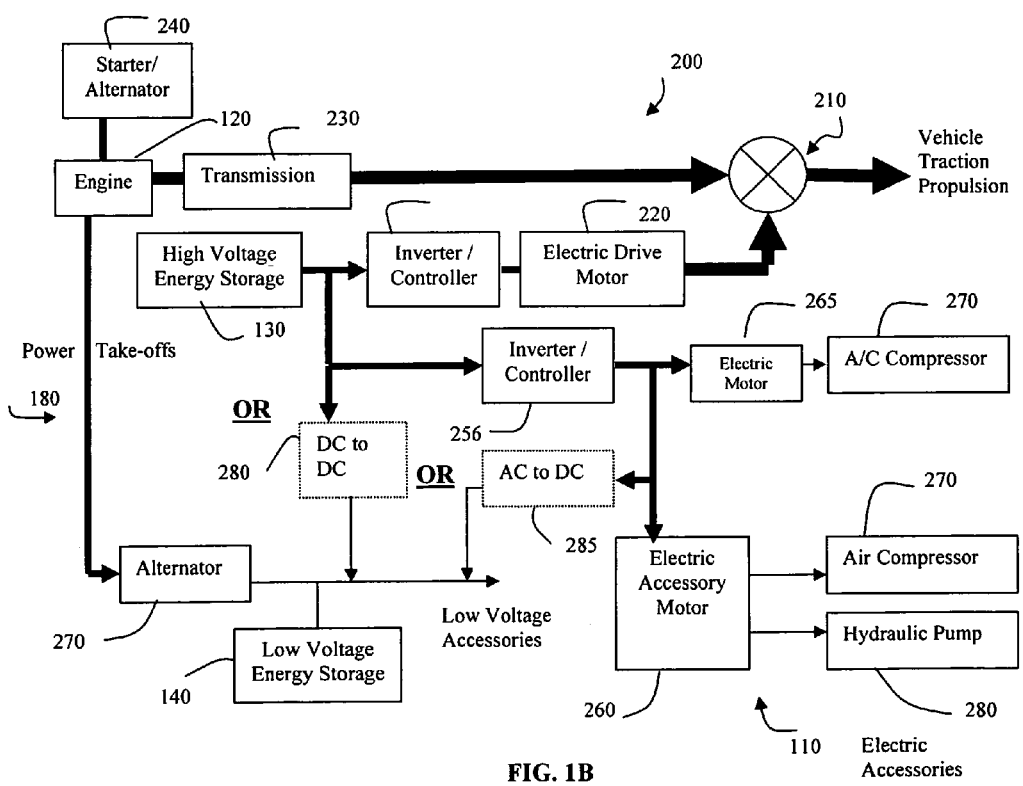
FIG. 1B is a block diagram of an embodiment of a parallel hybrid-electric drive system with electrically powered accessories.

With reference to FIG. 1B, an embodiment of a parallel hybrid-electric drive system 200 with electrically powered accessories 110 will be described. Again, the engine 120 can be turned off because both the high voltage requirements and the low voltage requirements are met by the respective energy storages 130, 140. FIG. 1B conceptually depicts that the electric motor mechanical output and the engine mechanical output operate in parallel and are coupled together to add power and torque to the traction propulsion drive train 210. In a typical implementation, a motor 220 is located in front or behind a transmission 230 and turns the same mechanical torque shaft as the engine and transmission. In the Stop-Start method of the present invention, the engine 120 and the electric motor 220 must be able to decouple from the vehicle propulsion drive train 210 to allow the electric motor 220 to spin the engine 120 during engine startup. Turning off and restarting of the vehicle internal combustion engine does not cause engine damage and can be performed a multiplicity of times without causing degradation of the starting mechanism. Alternatively, in place of, or in addition to a standard low voltage starter, a separate generator/starter 240 capable of hundreds of restarts per day is provided for the engine 120.

As illustrated in FIGS. 1A and 1B, an air conditioning (A/C) compressor 250 is assumed to include its own electric motor drive 265 similar to the air conditioning units used in fixed buildings. In the embodiments shown, the hydraulic pump and air compressor units 270, 280 are driven by the single electric motor 260, but in an alternative embodiment, each may have its own electric motor. The low-voltage requirements are supplied by either a Power Take-Off (PTO) alternator or generator 270, a DC-to-DC converter 280 from the high voltage distribution bus, or an AC-to-DC power supply 285 from the AC inverter bus. The low-voltage energy storage 140 is also shown in the diagrams, but may be unnecessary if the DC-to-DC converter 280 were used and there was always sufficient energy available to start the engine 120.

Figure 2:
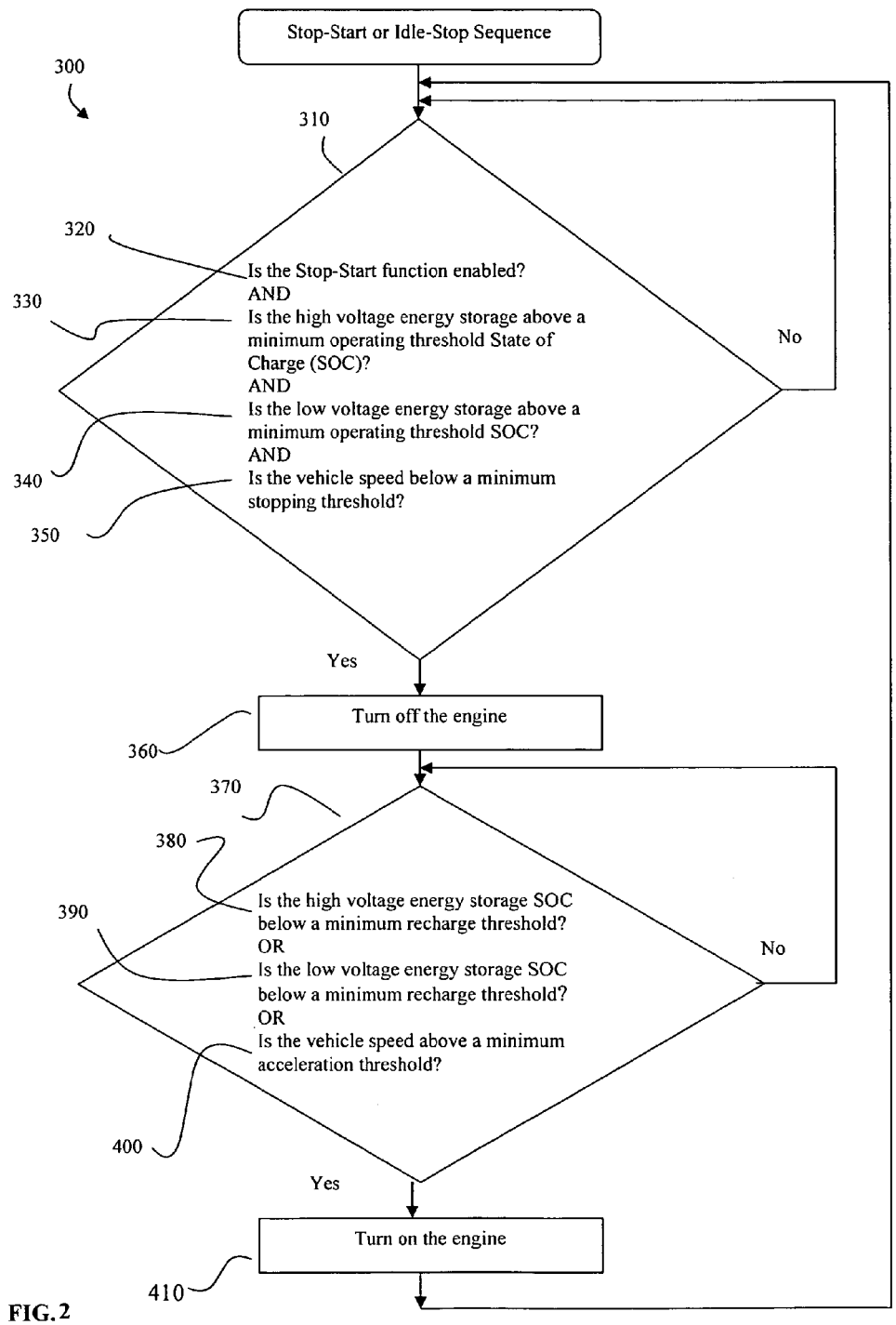
FIG. 2 is a flowchart of an exemplary stop-start control method.

With reference additionally to FIG. 2, an exemplary Stop-Start or Idle-Stop method 300 will be described. The method is embodied in the programmed software of the vehicle drive system control computer, which has the physical and protocol interfaces with the vehicle control and various component computers that control and report subsystem status. The software controls operation of the engine, generator, energy storage, and the drive system computer controllers to safely and efficiently turn off the engine 120 when the vehicle stops and restart the engine 120 when the vehicle starts moving again; thus, imitating the clean and quiet operation of a heavy duty electric powered vehicle (e.g., trolley bus).

At step 310, a determination is made as to whether the necessary conditions for turning off the engine 120 and keeping it turned off are met. First, because Stop-Start operation is not technically necessary to operate the vehicle, at step 320, a determination is made as to whether the Stop-Start or Idle-Stop function is enabled. Second, because the states of charge (SOC's) of the vehicle energy storage systems 130, 140 must be above minimum operating thresholds to sustain the accessory power requirements during a vehicle Stop-Start or Idle-Stop cycle, at steps 330, 340, a determination is made as to whether the states of charge (SOC's) of the vehicle energy storage systems 130, 140 must be above minimum operating thresholds to sustain the accessory power requirements during a vehicle Stop-Start or Idle-Stop cycle. The vehicle must be in a condition where it will not immediately need the traction power supplied by the engine 120 or engine/generator during the time required for at least one complete Stop-Start cycle. Thus, at step 350, a determination is made as to whether the vehicle speed is below a minimum stop engine threshold that would indicate that the vehicle is coming to a stop. In one or more additional embodiments, the method 300 may use time history information and route sensitive information from a vehicle location, and a route identification system that would allow the engine 120 to be turned off in noise-sensitive areas and during downhill travel when the engine 120 is not required.

During downhill travel in a standard drive system vehicle the engine 120 may use a "Jake" cylinder compression brake, the transmission may use a hydraulic compression "retarder", or an engine-transmission combination of a Jake brake and retarder may provide deceleration assistance. Because of this deceleration assistance and the PTO's for the control accessories, the engine 120 is not turned off when traveling downhill. In a hybrid-electric vehicle with electrically driven accessories 110 the engine 120 can be turned off because the deceleration assistance is provided by the braking regeneration drag of the electric propulsion motor on the drive train and the braking regeneration may provide enough power to run all the electrically driven accessories. When the high voltage electric energy storage 130 is full, braking regeneration power can be dissipated by braking resistors and by using the generator 150 to spin the engine 120 against its own compression and PTO loads. Thus, while the engine is spinning by means of the generator and not consuming fuel, the engine may power any PTO accessories such as a low voltage alternator, oil pump, and coolant pump. Additionally, as an alternative to separate electric accessories 110 or hydraulic accessories, the accessories could be left as engine PTO loads that continue to run when the engine fuel is cut off, powered from the generator 150 and high voltage energy storage 130.

At step 360, the Stop-Start control computer stops the engine 120 by commanding the engine control unit to turn off the injection signals to the fuel injectors. Thus, the engine 120 turns off by stopping the engine fuel supply. If the engine 120 was stopped by either turning off the ignition or stopping the air intake there is a possibility of damaging the engine 120 during turn on because of a build up of unburned fuel in one or more of the engine cylinders. In the Stop-Start method 300, the ignition and air intake are left on.

At step 370, a check is made for any condition that would require an engine restart. First, at steps 380, 390, a determination is made as to whether either of the SOC's of the vehicle high voltage or low voltage energy storage systems 130, 140 drops below minimum restart thresholds. If so, the engine 120 must restart. The restart thresholds are significantly below the operating thresholds so as to prevent an oscillation of the Stop-Start cycles. Second, if the vehicle needs more start-up traction power than can be provided by the stored high voltage energy 130 the engine 120 must restart to supply that power. At step 400, a determination is made as to whether the vehicle speed is above a minimum "start engine" threshold that would indicate that the vehicle is starting into launch acceleration. The "start engine" vehicle speed threshold is set far enough above the "stop engine" vehicle speed threshold to prevent Stop-Start cycle oscillation during normal operation of the vehicle. In one or more additional embodiments, the method 300 may use time history information and route sensitive information from a vehicle location, and a route identification system that would allow the engine to remain off in noise-sensitive areas and during downhill travel when the engine is not required. If any of these conditions 380, 390, 400 are met, at step 410, the engine 120 is turned on and control returns to step 310.

Figure 3:
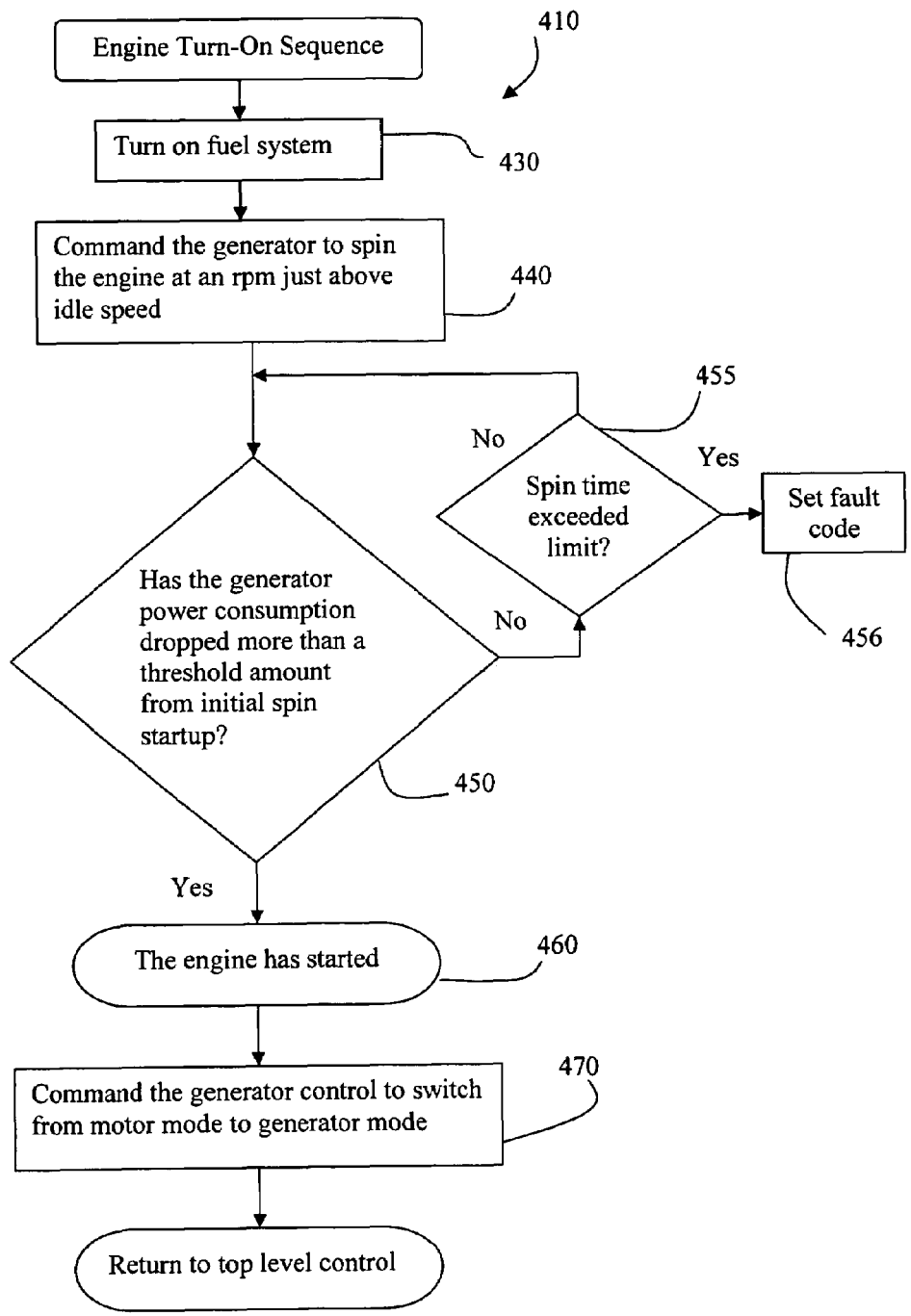
FIG. 3 is a flowchart of an exemplary engine turn-on sequence.

With reference to FIG. 3, the method 410 for turning on the engine 120 (without damaging the engine 120) will now be described. First, at step 430, is to turn on the fuel system by commanding the engine control unit to restore the signals to the fuel injectors.

Second, at step 440, is to spin the engine. In a series hybrid the generator 150 is switched to a motor and draws power from the high voltage system to rotate the engine 120 at an rpm above the engine idle rpm. In a parallel hybrid this function is performed by decoupling the motor 220 from the drive train or by using a separate starter. Some modern engines have a heavy-duty low voltage starter/alternator 240 that may function for this purpose if it is suitable to sustain the hundred of starts that may be required per day.

When the generator spins the engine 120 during startup, the Stop-Start or Idle-Stop control computer, at step 450 monitors the power required by the generator to keep the engine 120 spinning. When the required generator 150 power drops below a cranking power threshold the engine state, at step 460, is defined as running and, at step 470, the Stop-Start or Idle-Stop control computer commands the generator inverter/controller 155 to switch from the motor mode (power negative) back into the generator mode (power positive). At step 455 in a fail-safe control the engine spinning is stopped after a maximum allowed spin time and a fault code is set at step 456.

In one or more embodiments of the systems 100, 200, one or both of the systems 100, 200 may include one or more the following: the software resides in an STW hybrid vehicle controller that uses an SAE J1939 "CAN" control area network to interface to the high voltage and low voltage electric energy storage 130, 140, and other vehicle sensors and actuators; the systems 100, 200 include Siemens "ELFA" electric drive components including the generator 150, DUO-Inverter/controller 155, 156, 157 and electric propulsion motor 159; the speed is determined by reading the electric motor rpm through the motor controller 156; the low voltage SOC is determined from an analog to digital sensor that reads the battery voltage; the high voltage SOC is determined from the energy storage controller 158; the energy storage can be ultracapacitors, batteries, flywheels, or other device that stores and supplies electrical energy; the generator rpm and power level is obtained and controlled through the generator inverter/controller 155; the engine rpm can also be obtained from either the generator controller 155 or the engine electronic control unit; and control of the engine 120 is performed through the CAN interface to the engine control unit.

Figure 4:
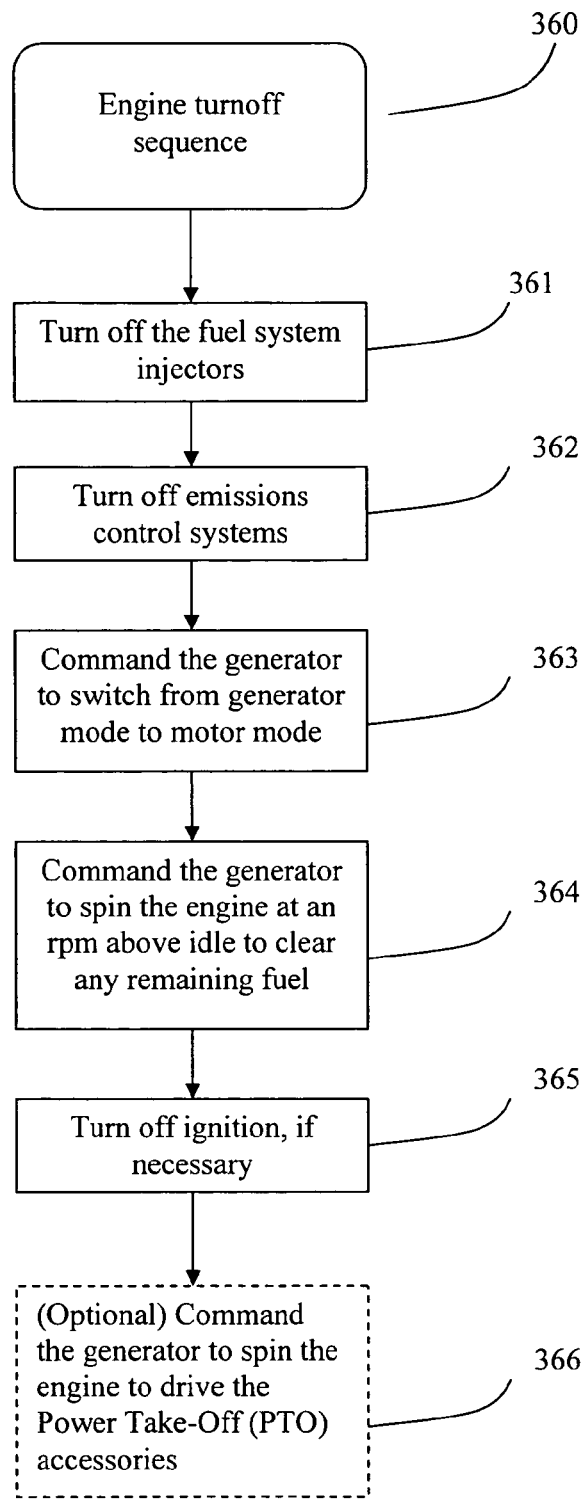
FIG. 4 is a flow chart of an exemplary engine turnoff sequence

With reference to FIG. 4, an exemplary engine turnoff or shutdown sequence 360 includes, at step 361, turning off the fuel injectors supply of fuel to the engine 120. The fuel pump is not turned off so as to provide the fuel pressure as will be required for engine restart. Typically, to minimize exhaust emissions there may also be some emissions control devices to be shut down like evaporative control and EGR. Thus, at step 362, the emissions control systems are turned off. At step 363, the generator 150 is switched to motor mode to spin the engine 120 to clear any remaining fuel and send the exhaust products to the exhaust aftertreatment. Thus, at step 364, the generator 150 is commanded to spin the engine 120 at an rpm above idle to clear any remaining fuel. For a spark ignition engine, spark ignition is turned off at step 365, if necessary for engine control operation. Finally, at optional step 366, the generator 150 can be commanded to spin the engine 120 to run any PTO accessory devices 180 without consuming engine fuel. Such an operation is useful for maintaining engine crankshaft rotation at a stop, during stored energy only operation, and for slowing a vehicle during downhill travel as described by the flow diagram sequence in FIG. 5 below. Braking regeneration puts a drag on the vehicle driveline while providing power for the generator 150 to spin the engine 120. The generator 150 works against the engine compression and the load power required by the PTO devices.

Figure 5:
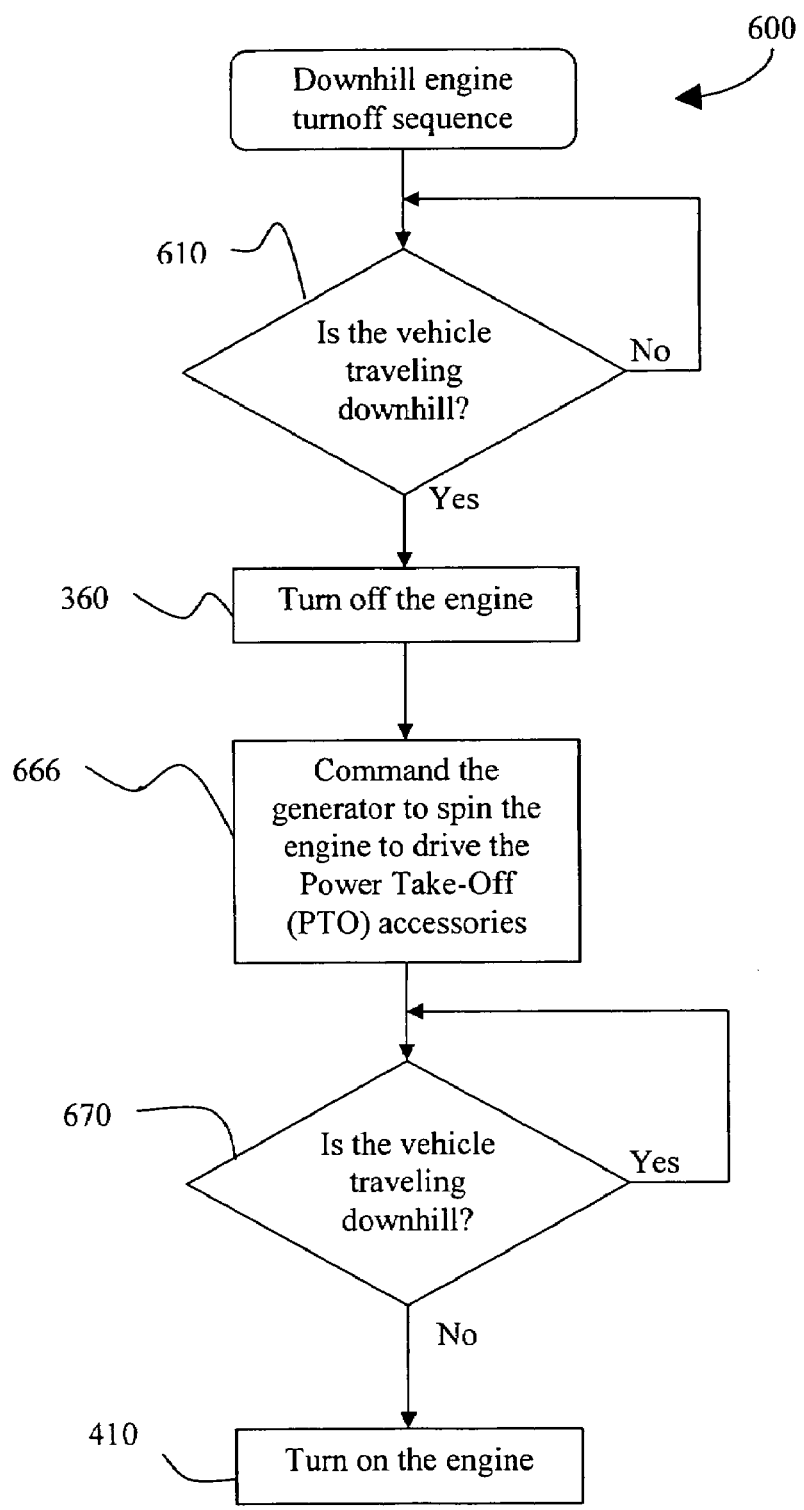
FIG. 5 is a flow chart of an exemplary engine turnoff sequence when the vehicle is traveling downhill.

With reference to FIG. 5, an exemplary downhill engine turnoff sequence 600 includes, at step 610, first determining if the vehicle is traveling downhill from vehicle location and direction of travel along with topographic information, route, information, and/or vehicle attitude information. If it is determined that the vehicle is traveling downhill, at step 350, the engine 120 is turned off as described by the flow diagram in FIG. 4. Typically, at this point and not shown, the propulsion motor 159 switches from motor mode to generator mode. At step 666, the generator 150 switches to motor mode to spin the engine 120. This operation continues until the vehicle is no longer traveling downhill as determined in step 670. Finally, normal operation is resumed at step 410 where the engine restart sequence is initiated.

Figure 6:
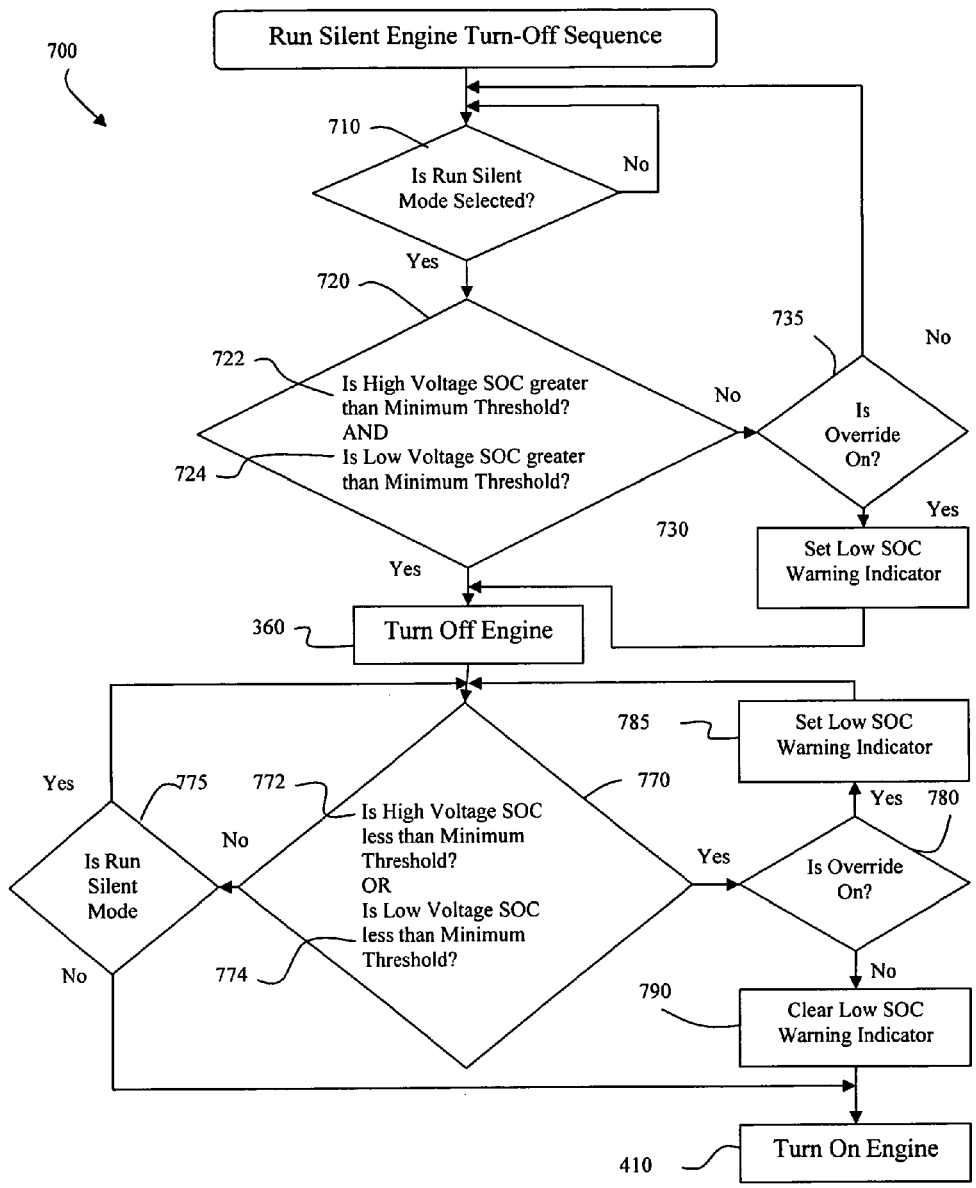
FIG. 6 is a flow chart of an exemplary engine turnoff sequence when the vehicle is traveling propelled by stored energy only, e.g., silent operation.

With reference to FIG. 6, an exemplary Run Silent mode engine turnoff sequence 700 includes, at step 710, first determining if the run silent mode has been selected manually or automatically from vehicle location and direction of travel along with topographic information, route, information, and/or vehicle attitude information. If it is determined that the run silent mode has been selected, at step 720, a determination is made that the states of charge (SOC's), step 722 and step 724, of the high and low voltage vehicle energy storage systems 130, 140 are above minimum operating thresholds to sustain the accessory power requirements if the engine is turned off. If the SOC's are above the minimum operating thresholds, at step 360 the engine 120 is turned off as described by the flow diagram in FIG. 4. If the SOC's are below the minimum operating thresholds, at step 730 a low SOC warning indicator is set and at step 735 a determination is made if an override is set. If the override is not on the control passes back to the start at step 710. If the override is on for testing, maintenance, or emergency purposes, control passes to step 360 where the engine 120 is turned off as described by the flow diagram in FIG. 4. The engine turn off sequence at step 360 includes the optional step of continuing to spin the engine 120 to drive the PTO accessories 180 with the fuel cut off.

At step 770, a check is made for any condition that would require an engine restart. First, at steps 772, 774, a determination is made as to whether either of the SOC's of the vehicle high voltage or low voltage energy storage systems 130, 140 drops below minimum restart thresholds. The restart thresholds are significantly below the operating thresholds so as to prevent an oscillation of the Stop-Start cycles. If the SOC's are above the thresholds a determination is made at step 775 as to whether the Run Silent mode is still selected. If the Run Silent mode is still selected control passes back to step 770. If the Run Silent mode has been cancelled the control passes to restart the engine at step 410.

Returning to step 770, if the SOC's are below the minimum thresholds, a determination is made at step 780 as to whether the override is selected. If the override is on, the low SOC warning indicator is set at step 785 and control is passed back to step 770. At step 780, if the override is off the low SOC warning indicator is cleared at step 790 and finally, normal operation is resumed at step 410 where the engine restart sequence is initiated.

In one or more additional embodiments, the method 700 may use time history information and route sensitive information from a vehicle location, and a route identification system that would allow the engine to remain off in noise-sensitive areas and during downhill travel when the engine is not required.

Figure 7:
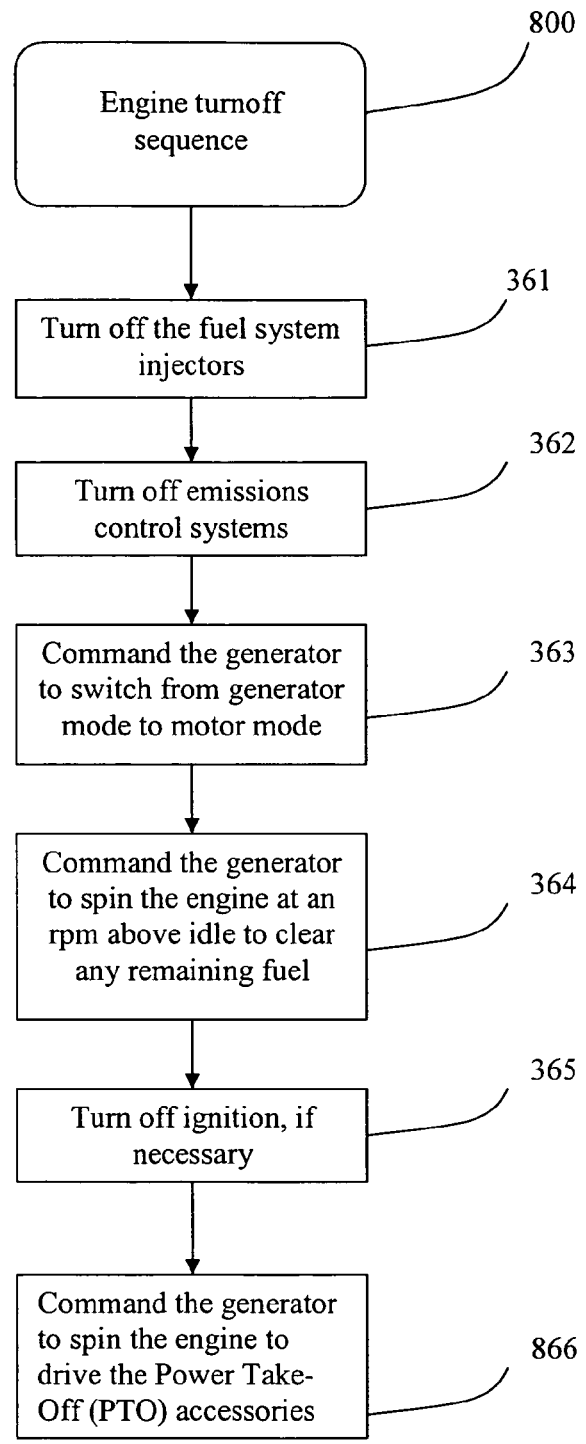
FIG. 7 is a flow chart of an exemplary engine turnoff sequence when the vehicle is stopped and the generator continues to spin the engine crankshaft.

With reference to FIG. 7, an exemplary engine turnoff or shutdown sequence 800 never stops engine crankshaft rotation and includes, at step 361, turning off the fuel injectors supply of fuel to the engine 120. The fuel pump is not turned off so as to provide the fuel pressure as will be required for engine restart. Typically, to minimize exhaust emissions there may also be some emissions control devices to be shut down like evaporative control and EGR. Thus, at step 362, the emissions control systems are turned off. At step 363, the generator 150 is switched to motor mode to spin the engine 120 to clear any remaining fuel and send the exhaust products to the exhaust aftertreatment. Thus, at step 364, the generator 150 is commanded to spin the engine 120 at an rpm above idle to clear any remaining fuel. For a spark ignition engine, spark ignition is turned off at step 365, if necessary for engine control operation. Finally, at step 866, the generator 150 is commanded to spin the engine 120 to run any PTO accessory devices 180 without consuming engine fuel. Such an operation is useful for maintaining engine crankshaft rotation at a stop, during stored energy only operation, and for slowing a vehicle during downhill travel as described by the flow diagram sequence in FIG. 5. Braking regeneration puts a drag on the vehicle driveline while providing power for the generator 150 to spin the engine 120. The generator 150 works against the engine compression and the load power required by the PTO devices.

Figure 8:
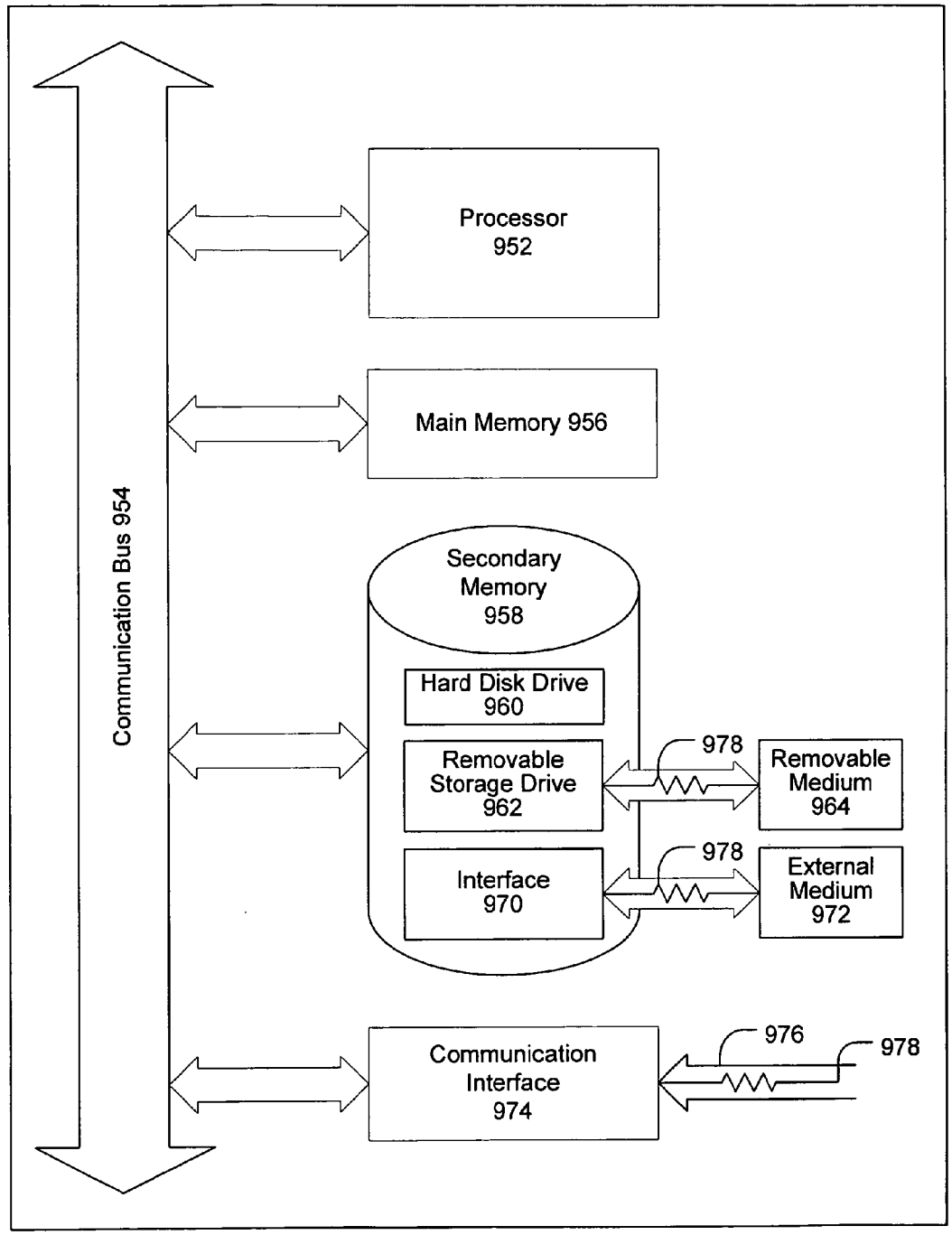
FIG. 8 is a block diagram illustrating an exemplary computer as may be used in connection with the systems to carry out the methods described herein.

FIG. 8 is a block diagram illustrating an exemplary computer 900 as may be used in connection with the systems 100, 200 to carry out the above-described methods 300, 410, 360, 366, 600; below described functions 700, 800; and other functions. For example, but not by way of limitation, the computer 900 may be a digital control computer that has the physical and protocol interfaces with the vehicle control and various component computers that control and report subsystem status. However, other computers and/or architectures may be used, as will be clear to those skilled in the art.

The computer 900 preferably includes one or more processors, such as processor 952. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 952.

The processor 952 is preferably connected to a communication bus 954. The communication bus 954 may include a data channel for facilitating information transfer between storage and other peripheral components of the computer 900. The communication bus 954 further may provide a set of signals used for communication with the processor 952, including a data bus, address bus, and control bus (not shown). The communication bus 954 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer 900 preferably includes a main memory 956 and may also include a secondary memory 958. The main memory 956 provides storage of instructions and data for programs executing on the processor 952. The main memory 956 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 958 may optionally include a hard disk drive 960 and/or a removable storage drive 962, for example a floppy disk drive, a magnetic tape drive, a compact disc ("CD") drive, a digital versatile disc ("DVD") drive, a flash memory drive stick, etc. The removable storage drive 962 reads from and/or writes to a removable storage medium or removable memory device 964 in a well-known manner. Removable storage medium 964 may be, for example, a floppy disk, magnetic tape, CD, DVD, flash memory drive stick, etc.

The removable storage medium 964 is preferably a computer readable medium having stored thereon computer executable code (i.e., software) and/or data. The computer software or data stored on the removable storage medium 964 is read into the computer 900 as electrical communication signals 978.

In alternative embodiments, secondary memory 958 may include other similar means for allowing computer programs or other data or instructions to be loaded into the computer 900. Such means may include, for example, an external storage medium 972 and an interface 970. Examples of external storage medium 972 may include an external hard disk drive or an external optical drive, external semiconductor memory, or an external magneto-optical drive.

Other examples of secondary memory 958 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 972 and interfaces 970, which allow software and data to be transferred from the removable storage unit 972 to the computer 900.

Computer 900 may also include a communication interface 974. The communication interface 974 allows software and data to be transferred between computer 900 and external devices (e.g. printers), networks, or information sources. For example, computer software or executable code may be transferred to computer 900 from a network server via communication interface 974. Examples of communication interface 974 include a modem, a network interface card ("NIC"), a communications port, a PCMCIA slot and card, an infrared interface, and an IEEE 1394 fire-wire, just to name a few.

Communication interface 974 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/internet protocol ("TCP/IP"), serial line internet protocol/point to point protocol ("SLIP/PPP"), and so on, but may also implement customized or non-standard interface protocols as well.

Software and data transferred via communication interface 974 are generally in the form of electrical communication signals 978. These signals 978 are preferably provided to communication interface 974 via a communication channel 976. Communication channel 976 carries signals 978 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 956 and/or the secondary memory 958. Computer programs can also be received via communication interface 974 and stored in the main memory 956 and/or the secondary memory 958. Such computer programs, when executed, enable the computer 900 to perform the various functions of the present invention as previously described.

In this description, the term "computer readable medium" is used to refer to any media used to provide computer executable code (e.g., software and computer programs) to the computer 900. Examples of these media include main memory 956, secondary memory 958 (including hard disk drive 960, removable storage medium 964, and external storage medium 972), and any peripheral device communicatively coupled with communication interface 974 (including a network information server or other network device). These computer readable mediums are means for providing executable code, programming instructions, and software to the computer 900.

In an embodiment that is implemented using software, the software may be stored on a computer readable medium and loaded into computer 900 by way of removable storage drive 962, interface 970, or communication interface 974. In such an embodiment, the software is loaded into the computer 900 in the form of electrical communication signals 978. The software, when executed by the processor 952, preferably causes the processor 952 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While embodiments and implementations of the invention have been shown and described, it should be apparent that many more embodiments and implementations are within the scope of the invention. Accordingly, the invention is not to be restricted, except in the light of the claims and their equivalents.

What is claimed is:

1. A method for efficiently controlling an engine of a heavy-duty hybrid-electric vehicle of at least 10,000 pounds Gross Vehicle Weight Rating (GVWR), the heavy-duty hybrid-electric vehicle having a generator, an inverter, a propulsion motor, a first energy storage, and a control computer, the method comprising:
   enabling a function comprising at least one of a Stop-Start and an Idle-Stop function;
   determining a first vehicle propulsion power requirement associated with an emergency situation of the heavy-duty hybrid-electric vehicle;
   determining a first energy storage first State Of Charge;
   when the energy storage first State Of Charge is above an energy storage first State Of Charge minimum threshold, turning off the engine if the first vehicle propulsion requirement is below a first vehicle propulsion requirement minimum threshold;
   when the energy storage first State Of Charge is below an energy storage first State Of Charge minimum threshold, turning off the engine if the first vehicle propulsion requirement is below a first vehicle propulsion requirement minimum threshold; and
   commanding the generator to spin the engine to drive at least one Power Take-Off accessory.

2. The method of claim 1, further comprising
   determining whether an override is on; and,
   wherein the turning off the engine if the first vehicle propulsion requirement is below a first vehicle propulsion requirement minimum threshold when the energy storage first State Of Charge is below an energy storage first State Of Charge minimum threshold, comprises , turning off the engine if the first vehicle propulsion requirement is below a first vehicle propulsion requirement minimum threshold when the energy storage first State Of Charge is below an energy storage first State Of Charge minimum threshold and the override is on.

3. The method of claim 2, further comprising activating a Warning Indicator if the energy storage first State Of Charge is below an energy storage first State Of Charge minimum threshold, and the override is on.

4. The method of claim 1, wherein the turning off the engine comprises turning off a fuel supply to the engine.

5. The method of claim 4, wherein the turning off the engine further comprises turning off an ignition to the engine.

6. The method of claim 5, wherein the turning off the engine comprises turning off an emission control system.

7. The method of claim 1, further comprising:
   switching the generator to operate as a motor; and,
   spinning the engine with the generator.

8. The method of claim 7, wherein the spinning the engine with the generator comprises driving at least one Power Take-Off accessory.

9. The method of claim 7, wherein the spinning the engine with the generator comprises electrically coupling the generator with a high voltage bus.

10. The method of claim 9, wherein the electrically coupling the generator with the high voltage bus comprises electrically supplying power from at least one of the energy storage and a braking regeneration energy source.

11. The method of claim 1, wherein the emergency situation of the heavy-duty hybrid-electric vehicle is determined from onboard sensors and a computer monitoring program.

12. The method of claim 1, further comprising:
   determining a second vehicle propulsion power requirement;
   determining an energy storage second State Of Charge;
   restarting the engine if the second vehicle propulsion requirement is above a second vehicle propulsion requirement minimum threshold; and,
   restarting the engine if the energy storage second State Of Charge is below an energy storage second State Of Charge minimum threshold, and the override is off.

13. The method of claim 12, wherein, to limit oscillations, at least one of:
   the first vehicle propulsion requirement minimum threshold is significantly below the second vehicle propulsion requirement minimum threshold, and,
   the energy storage second State Of Charge minimum threshold is significantly below the energy storage first State Of Charge minimum threshold.

14. The method of claim 12, wherein the energy storage second State Of Charge is below the energy storage second State Of Charge minimum threshold if the energy storage second State Of Charge is less than a minimum operating threshold to sustain an accessory power requirement during at least one of a Stop-Start cycle and a Idle-Stop cycle.

15. The method of claim 12, wherein the restarting the engine comprises:
   switching the generator to operate as a motor; and,
   spinning the engine with the generator.

16. The method of claim 1, wherein the energy storage comprises a high voltage energy storage.

17. The method of claim 16, wherein the high voltage energy storage comprises one or more ultracapacitors.

18. The method of claim 1, wherein the control computer is configured to communicate over a control area network (CAN).

19. The method of claim 1, wherein the generator is nominally rated at 650 V with at least 20 kW of power.

20. The method of claim 1, wherein the propulsion motor is nominally rated at 650 V with at least 15 kW of power.

21. The method of claim 1, wherein the inverter comprises an IGBT high power switching device nominally rated at 650 V with multiple phase.

22. The method of claim 1, wherein the heavy-duty hybrid-electric vehicle is a configured as a series hybrid drive.

* * * * *